Oct. 30, 1956  W. V. McCLURE, JR  2,768,607
FEEDER DEVICE FOR LIVESTOCK
Filed March 2, 1953
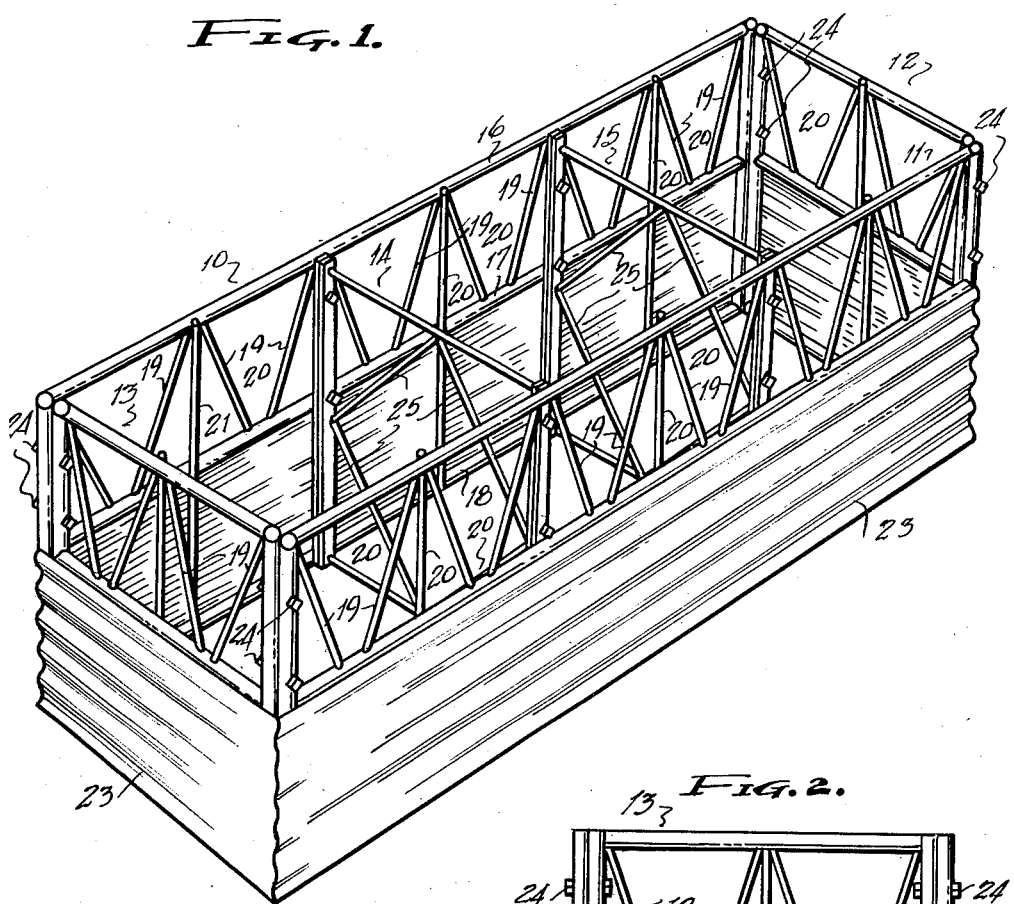
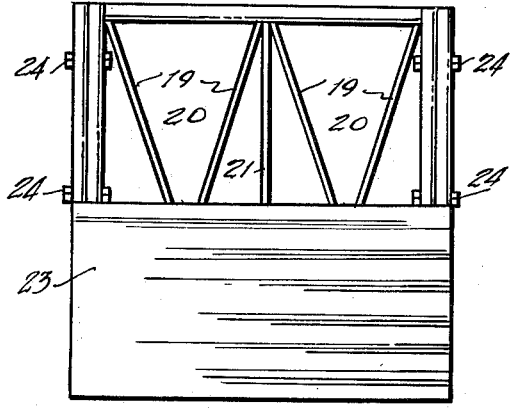
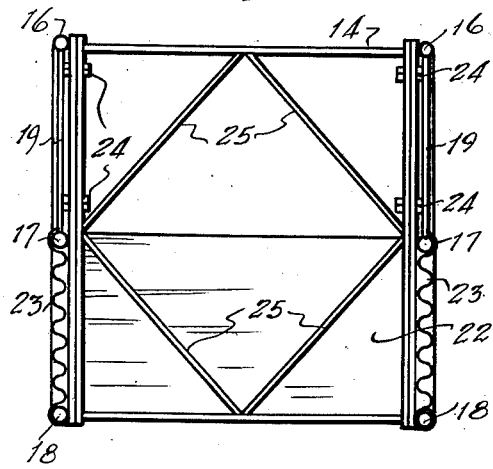
William V. McClure, Jr.
INVENTOR.
BY Cecil L. Wood
ATTORNEY United States Patent Office 2,768,607
Patented Oct. 30, 1956

2,768,607

FEEDER DEVICE FOR LIVESTOCK

William V. McClure, Jr., Smithfield, Tex.

Application March 2, 1953, Serial No. 339,849

1 Claim. (Cl. 119—60)

This invention relates to feeding devices for livestock, and the like, and it has particular reference to a portable feeder for containing hay, silage, and other roughage from which livestock, particularly cattle, can be fed in pens and in open pasture, and its principal object resides in the provision of a feeding device which can be assembled or dismantled with a minimum of difficulty and effort.

Another object of the invention is that of providing a feeder of the character described which is easily portable, being capable of a mounting on skids whereby the device can be moved from one location to another, as from one pasture or feed lot to another, thus affording a means for maintaining suitable roughage before the animals at all times, especially during seasons of the year when pasturage is inadequate.

Broadly, the invention contemplates the provision of an economical feeding apparatus which is durable but capable of being prefabricated by a manufacturer and packaged for shipment to be assembled at the location where employed for use, or may be dismantled, if desired, for storage when not in use. The device is capable of construction from light materials, as with pipe or aluminum tubing, and provides a means for economical feeding since hay or roughage deposited therein can be properly preserved from loss by being trampled by the livestock and from the elements.

While the foregoing objects are paramount, other and lesser objects will become manifest as the description proceeds, taken in connection with the appended drawings wherein:

Figure 1 is an isometric view of the invention showing the construction and assembly of the frame sections.

Figure 2 is an end view of the invention, and

Figure 3 is a lateral cross-sectional view thereof showing the cross framing between the end sections.

An important object of the invention is that of providing a suitable feeding device for dairymen and livestock feeders for feeding silage and hay which, when strewn upon the ground in inclement weather, will deteriorate and be subjected to loss and damage by being trampled by the animals or blown away by the wind. The animals can gain access to the materials placed in the feeder through stanchions formed in the framework while the lower part of the structure is enclosed to contain the products and protect the same from the wind.

Accordingly, the invention comprises a plurality of sections 10, 11, 12 and 13, which form the side and end sections, and the central sections 14 and 15 providing the supporting framework between the end sections. It is preferable that the assembly be formed from tubing, as pipe, and flat strap iron or rods, and corrugated sheet iron about the enclosed lower portion which can be secured by bolting or by screws especially prepared for the purpose.

The side sections are prepared by providing a plurality of horizontal members 16, 17 and 18, the former serving as a top member while the element 17 is an intermediate member spaced below the top member 16 and connected thereto by angular braces 19 formed in substantial V-shape to provide stanchions 20 through which the animals can gain access to the feed products contained in the device. The side members 10 and 11 are connected at spaced intervals between their ends by the central sections 14 and 15 which are arranged transversely through the device, as apparent in Figure 1.

The end sections 12 and 13 are actually formed in the same manner as the side sections 10 and 11 but much shorter, having a lesser number of the stanchions 20, the angular braces 19 being connected between the members 16 and 17 in the same manner as in the side members. Each of the stanchions 20, however are divided by vertical standards 21 which extend between the top members 16 and the bottom members 18 on both the end and side sections. Below the intermediate member 17 on the side and end sections 10, 11, 12 and 13 is an enclosure 22 embraced by corrugated sheet metal 23. The sheet metal 23 can be secured by any desired method, as described.

The side and end sections are secured together by bolts 24, as are the central sections 14 and 15 which latter preferably have vertical bars of flat steel and a plurality of cross-members 25 for suitable bracing. The enclosure 22 is bottomless but affords a restricted area for enclosing the feed materials deposited in the device. Obviously, a top may be installed on the structure if desired.

Manifestly, the structure herein shown and described is capable of certain changes and modifications by persons skilled in the art without departing from the spirit and intent of the invention or the scope of the appended claim.

What is claimed is:

In a livestock feeder a rectangular frame structure comprising a pair of end sections, a pair of side sections, and at least one central section having a similar outline to said end sections, said central and end sections having vertical corner posts, said side members including corresponding vertical posts whereby when assembled said end and central section posts and said side posts are adjacent and in alignment whereby detachable means are employed to rigidly connect said sections and members at said posts to provide an enclosure for containing feedstuffs deposited on the ground; said end sections and said side members including an enclosed portion about the lower part thereof and including angular braces extending across the open upper part, said braces providing structural support to said end and side members and also defining stanchions to facilitate feeding of livestock.

References Cited in the file of this patent

UNITED STATES PATENTS

| 284,091 | Tolbert | Aug. 28, 1883 |
| 1,084,930 | Eckelberg | Jan. 20, 1914 |
| 2,500,889 | Winkler | Mar. 14, 1950 |
| 2,533,984 | Anson | Dec. 12, 1950 |

FOREIGN PATENTS

| 661 | Great Britain | 1881 |